(12) United States Patent
Curcio et al.

(10) Patent No.: US 8,565,581 B2
(45) Date of Patent: Oct. 22, 2013

(54) METHOD AND APPARATUS FOR SELECTING CONTENT SEGMENTS

(75) Inventors: Igor Danilo Diego Curcio, Tampere (FI); Sujeet Shyamsundar Mate, Tampere (FI); Kostadin Dabov, Tampere (FI); Francesco Cricri, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/294,729

(22) Filed: Nov. 11, 2011

(65) Prior Publication Data

US 2012/0251070 A1   Oct. 4, 2012

Related U.S. Application Data

(60) Provisional application No. 61/413,051, filed on Nov. 12, 2010.

(51) Int. Cl.
*H04N 9/80*     (2006.01)
(52) U.S. Cl.
USPC .......................................................... 386/241
(58) Field of Classification Search
None
See application file for complete search history.

(56) References Cited

U.S. PATENT DOCUMENTS

| | | |
|---|---|---|
| 6,101,332 A | 8/2000 | Satoh |
| 2002/0051634 A1 | 5/2002 | Sato |
| 2002/0061189 A1 | 5/2002 | Sato |
| 2008/0019661 A1 | 1/2008 | Obrador et al. |
| 2009/0051783 A1 | 2/2009 | Kim et al. |
| 2010/0146055 A1 | 6/2010 | Hannuksela |
| 2010/0214419 A1 | 8/2010 | Kaheel et al. |
| 2012/0059826 A1 | 3/2012 | Mate et al. |
| 2012/0060077 A1 | 3/2012 | Mate et al. |

FOREIGN PATENT DOCUMENTS

EP     1 770 638 A2     4/2007

OTHER PUBLICATIONS

International Search Report and Written Opinion for Application No. PCT/FI2011/050997 dated Feb. 29, 2012.

*Primary Examiner* — Huy T Nguyen
(74) *Attorney, Agent, or Firm* — Alston & Bird LLP (57) ABSTRACT

A method, apparatus and computer program product select content segments based at least in part on a contextual similarity level between the content segments and at least one of brightness levels, blur levels, and shake levels of the content segments. As such, a resultant video may be produced that comprises selected content segments. Accordingly, brightness levels of the content may be improved and shake and blur levels reduced while maintaining a desired field of view.

20 Claims, 6 Drawing Sheets

METHOD AND APPARATUS FOR SELECTING CONTENT SEGMENTS

CROSS REFERENCE TO RELATED APPLICATION

This application claims priority to U.S. Provisional Patent Application No. 61/413,051, filed on Nov. 12, 2010, the contents of which are incorporated by reference herein.

TECHNOLOGICAL FIELD

An example embodiment of the present invention relates generally to techniques for selecting content segments and, more particularly, relates to an apparatus, a method and a computer program product for determining contextual characteristics associated with content segments, comparing the contextual characteristics to determine a contextual similarity level, determining brightness levels, blur levels, and/or shake levels for content segments, and selecting one of the content segments based at least in part on the contextual similarity level and the brightness levels, blur levels, and/or the shake levels.

BACKGROUND

In order to provide easier or faster information transfer and convenience, telecommunication industry service providers are continually developing improvements to existing communication networks. As a result, wireless communication has become increasingly more reliable in recent years. Along with the expansion and improvement of wireless communication networks, mobile terminals used for wireless communication have also been continually improving. In this regard, due at least in part to reductions in size and cost, along with improvements in battery life and computing capacity, mobile terminals have become more capable, easier to use, and cheaper to obtain. Due to the now ubiquitous nature of mobile terminals, people of all ages and education levels are utilizing mobile terminals to communicate with other individuals or contacts, receive services and/or share information, media and other content.

For example, at any given event such as a concert or festival, a plurality of users may be present with respective user terminals capable of recording and sharing content relating to the event. Thereby, for example, users at locations remote from the event may be able to receive content relating to the event. However, limitations with respect to the sensory devices carried by the user terminals as well as unfavorable conditions associated with recording the content may result in some of the content that is captured being dark with poor contrast (where objects cannot be distinguished) with random noise (e.g., defects). For example, camera sensors may include a limited number of pixels and a relatively small aperture. Further, it may be difficult to improve the brightness of the content after capture without increasing the level of random noise in the content. In addition, unfavorable conditions associated with recording conditions may lead to video content being shaky and/or blurry due to unintentional user terminal movements. Shake and blur may also be difficult to remove with post-processing techniques. Accordingly, content capture using user terminals may suffer from impediments.

BRIEF SUMMARY

A method, apparatus and computer program product therefore select content segments based at least in part on a contextual similarity level between the content segments and at least one of brightness levels, blur levels, and shake levels of the content segments. As such, for example, a resultant video may be produced that comprises selected content segments. Accordingly, for example, brightness levels of the content may be improved and shake and blur levels reduced while maintaining a desired field of view.

BRIEF DESCRIPTION OF THE DRAWINGS

Having thus described embodiments of the present disclosure in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a computer-readable storage medium, which refers to a non-transitory, physical storage medium (e.g., volatile or non-volatile memory device), can be differentiated from a computer-readable transmission medium, which refers to an electromagnetic signal.

Figure 1:
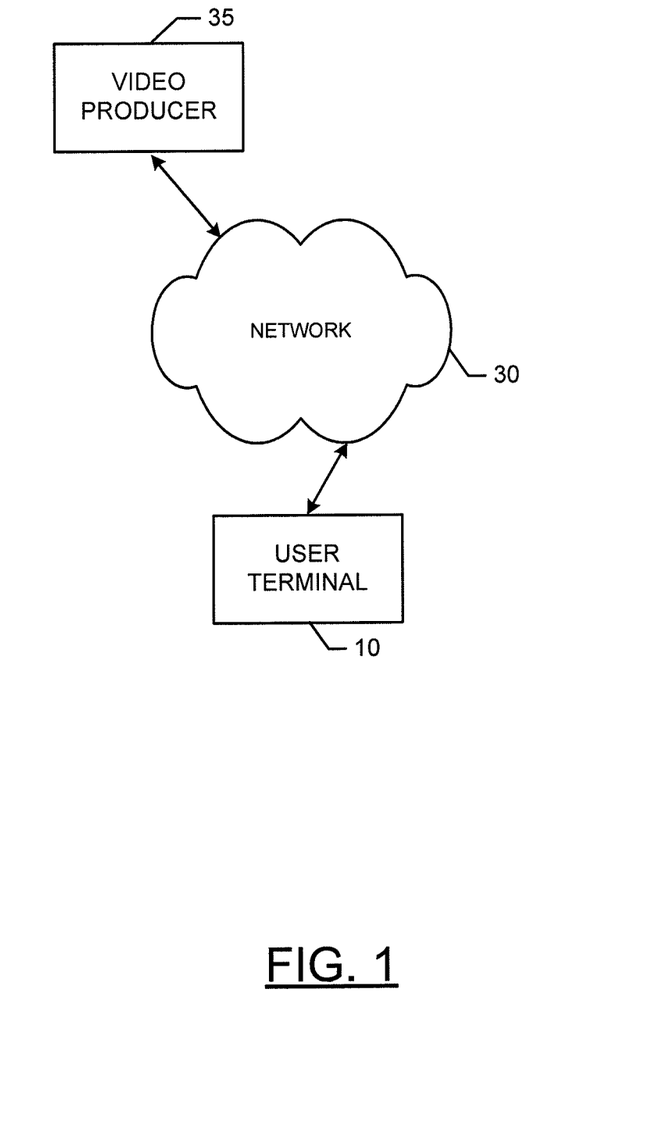
FIG. 1 illustrates a schematic block diagram of a system according to an example embodiment of the present invention.

As indicated above, some embodiments of the present invention may be employed in methods, apparatuses and computer program products configured to select content segments. In this regard, for example, FIG. 1 illustrates a block diagram of a system that may benefit from embodiments of the present invention. It should be understood, however, that the system as illustrated and hereinafter described is merely illustrative of one system that may benefit from an example embodiment of the present invention and, therefore, should not be taken to limit the scope of embodiments of the present invention.

As shown in FIG. 1, a system in accordance with an example embodiment of the present invention may include a user terminal 10. The user terminal 10 may be any of multiple types of fixed or mobile communication and/or computing devices such as, for example, personal digital assistants (PDAs), pagers, mobile televisions, mobile telephones, gaming devices, laptop computers, personal computers (PCs), cameras, camera phones, video recorders, audio/video players, radios, global positioning system (GPS) devices, or any combination of the aforementioned, which employ an embodiment of the present invention.

In some embodiments the user terminal 10 may be capable of communicating with other devices, either directly, or via a network 30. The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like. Thus, the network 30 may be a cellular network, a mobile network and/or a data network, such as a local area network (LAN), a metropolitan area network (MAN), and/or a wide area network (WAN), for example, the Internet. In turn, other devices such as processing elements (for example, personal computers, server computers or the like) may be included in or coupled to the network 30. By directly or indirectly connecting the user terminal 10 and the other devices to the network 30, the user terminal and/or the other devices may be enabled to communicate with each other, for example, according to numerous communication protocols including Hypertext Transfer Protocol (HTTP) and/or the like, to thereby carry out various communication or other functions of the user terminal and the other devices, respectively. As such, the user terminal 10 and the other devices may be enabled to communicate with the network 30 and/or each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as wireless LAN (WLAN), Worldwide Interoperability for Microwave Access (WiMAX), WiFi, ultra-wide band (UWB), Wibree techniques and/or the like and fixed access mechanisms such as digital subscriber line (DSL), cable modems, Ethernet and/or the like. Thus, for example, the network 30 may be a home network or other network providing local connectivity.

The user terminal 10 may be configured to record content comprising a plurality of content segments. For example, the user terminal 10 may be configured to record content in the form of video, and hence the content segments may comprise one or more frames of the video. In some embodiments the user terminal 10 may be configured to provide the recorded content segments to a video production server 35. The video producer 35 may be configured to produce a resultant video from one or more content segments provided by one or more devices, such as the user terminal 10. In some embodiments the video producer 35 may be embodied as a server, server bank or other computer or other computing device or node configured to produce a resultant video. The video producer 35 may have any number of functions or associations with various services. As such, for example, the video producer 35 may be a platform such as a dedicated server (or server bank), or the video producer may be a backend server associated with one or more other functions or services.

Thus, the video producer 35 may produce a resultant video from content segments provided by the user terminal 10 and/or other devices. However, in alternate embodiments, such as embodiments employing a peer-to-peer (P2P) network, the function of producing a resultant video may be carried out on the user terminal 10 itself, instead of on a separate device such as the video producer 35. In some embodiments signaling between the user terminal 10, network 30, and/or the video producer 35 may occur via HTTP, session initiation protocol (SIP), real-time streaming protocol (RTSP), and/or real-time transport control protocol (RTCP), although various other transport mechanisms may be employed in other embodiments.

Figure 2:
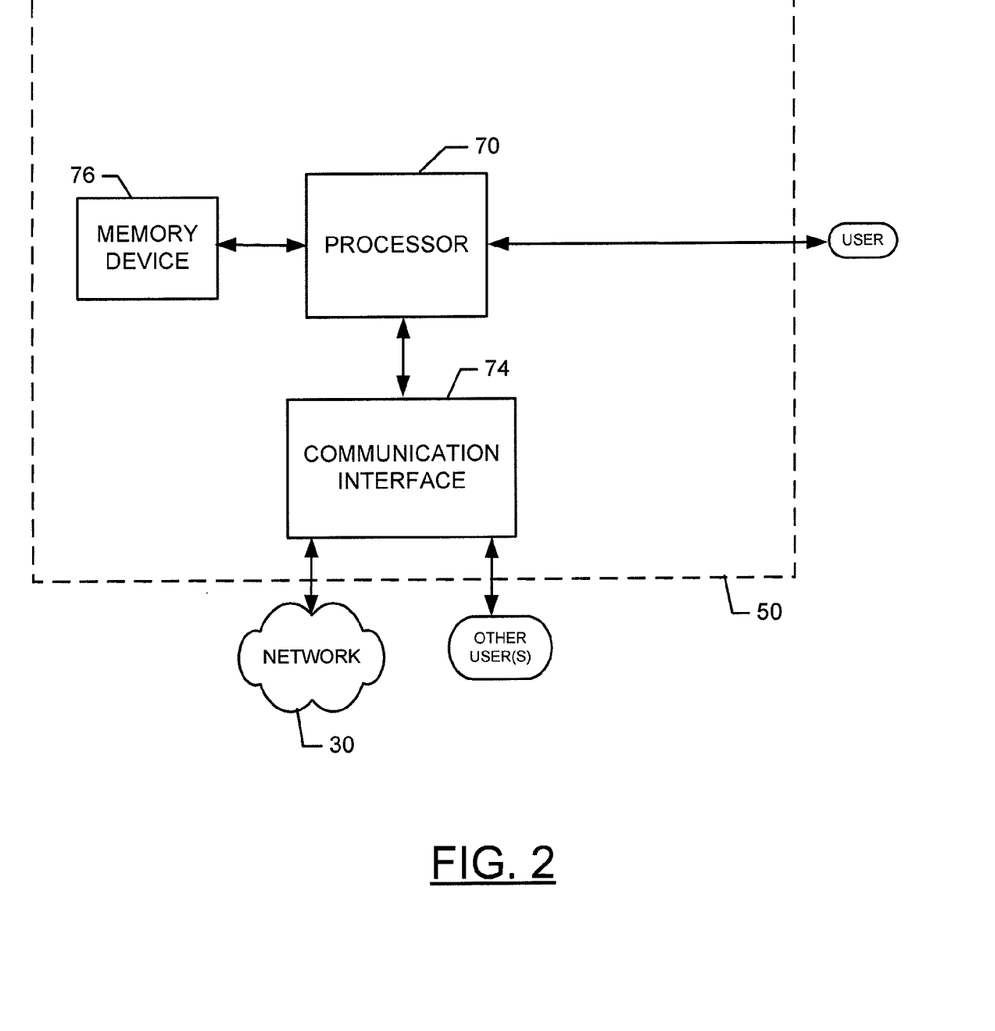
FIG. 2 illustrates a schematic block diagram of an apparatus configured to select a content segment according to an example embodiment of the present invention.
Figure 3:
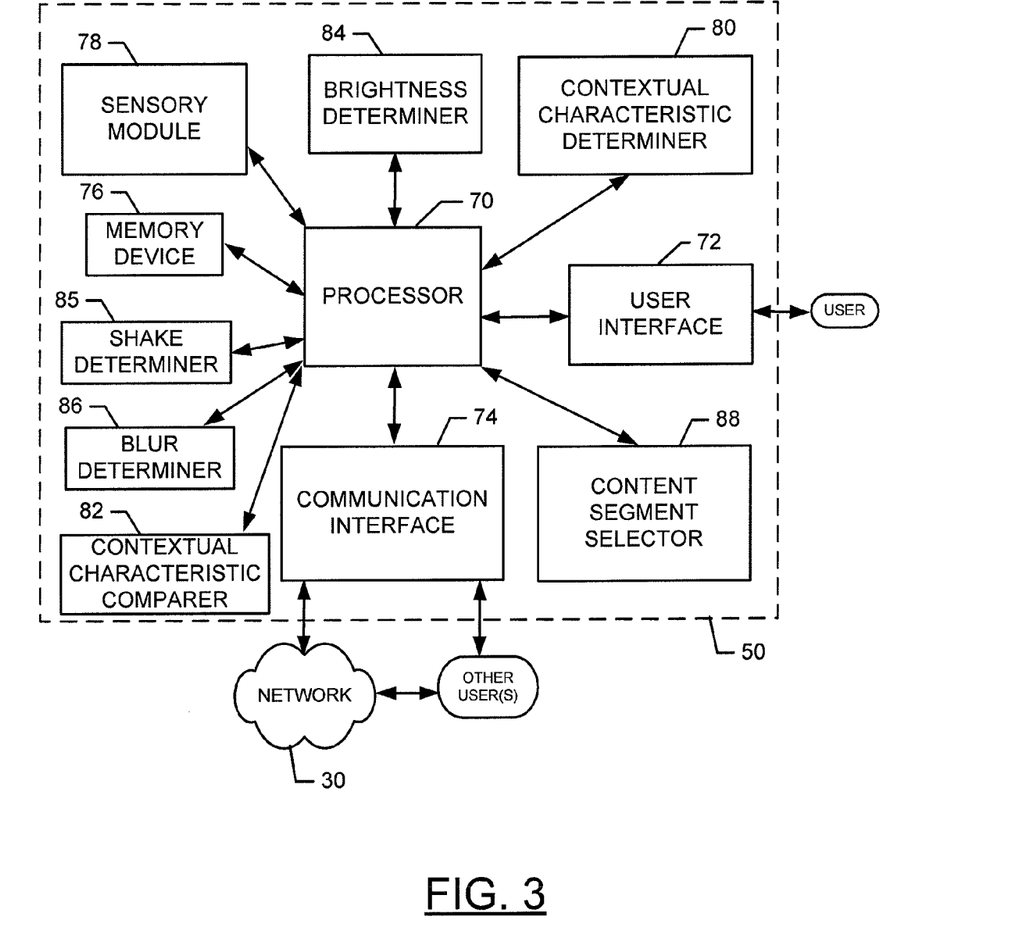
FIG. 3 illustrates a schematic block diagram of an embodiment of the apparatus of FIG. 2 including additional components configured to select a content segment according to an example embodiment of the present invention.

In example embodiments illustrated in FIGS. 2 and 3, an apparatus 50 is provided that may be employed by devices performing example embodiments of the present invention. The apparatus 50 may be embodied, for example, as any device hosting, including, controlling, comprising, or otherwise forming a portion of the user terminal 10 and/or the video producer 35. However, embodiments may also be embodied on a plurality of other devices such as for example where instances of the apparatus 50 may be embodied on the network 30. As such, the apparatus 50 of FIGS. 2 and 3 is merely an example and may include more, or in some cases less, than the components shown in FIGS. 2 and 3.

With further regard to FIGS. 2 and 3, the apparatus 50 may be configured to record and/or select content segments. As depicted in FIG. 2, the apparatus 50 may include or otherwise be in communication with a processor 70, a communication interface 74, and a memory device 76. The memory device 76 may include non-transitory and tangible memory that may be, for example, volatile and/or non-volatile memory. The memory device 76 may be configured to store information, data, files, applications, instructions or the like. For example, the memory device 76 could be configured to buffer input data for processing by the processor 70. Additionally or alternatively, the memory device 76 could be configured to store instructions for execution by the processor 70.

As mentioned above, the apparatus 50 may, in some embodiments, be a user terminal or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 70 may be embodied in a number of different ways. For example, the processor 70 may be embodied as one or more of various processing means such as a coprocessor, a microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a hardware accelerator, a special-purpose computer chip, or other hardware processor. In an example embodiment, the processor 70 may be configured to execute instructions stored in the memory device 76 or otherwise accessible to the processor. Alternatively or additionally, the processor 70 may be configured to execute hard coded functionality. As such, whether configured by hardware or software methods, or by a combination thereof, the processor 70 may represent an entity (for example, physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor to perform the algorithms and/or operations described herein when the instructions are executed. However, in some cases, the processor 70 may be a processor of a specific device (for example, a user terminal or network device such as a server) adapted for employing embodiments of the present invention by further configuration of the processor by instructions for performing the algorithms and/or operations described herein. The processor 70 may include, among other things, a clock, an arithmetic logic unit (ALU) and logic gates configured to support operation of the processor.

The communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (for example, network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet, High-Definition Multimedia Interface (HDMI) or other mechanisms. Furthermore, the communication interface 74 may include hardware and/or software for supporting communication mechanisms such as BLUETOOTH®, Infrared, UWB, WiFi, and/or the like, which are being increasingly employed in connection with providing home connectivity solutions.

As mentioned above, embodiments of the apparatus 50 may include more, or in some cases less, than the components shown in FIG. 2. In this regard, FIG. 3 illustrates an embodiment of the apparatus 50 comprising additional components configured to record and/or select content segments. The apparatus 50 may include or otherwise be in communication with the processor 70, the communication interface 74, and the memory device 76 as described above with respect to FIG. 2.

In some embodiments the apparatus 50 may further comprise a user interface 72. The user interface 72 may be in communication with the processor 70 to receive an indication of a user input at the user interface and/or to provide an audible, visual, mechanical or other output to the user. As such, the user interface 72 may include, for example, a keyboard, a mouse, a joystick, a display, a touch screen, a microphone, a speaker, or other input/output mechanisms.

The processor 70 may comprise user interface circuitry configured to control at least some functions of one or more elements of the user interface 72, such as, for example, the speaker, the ringer, the microphone, the display, and/or the like. The processor 70 and/or user interface circuitry comprising the processor 70 may be configured to control one or more functions of one or more elements of the user interface 72 through computer program instructions (for example, software and/or firmware) stored on a memory accessible to the processor 70 (for example, memory device 76, and/or the like).

In some embodiments the apparatus 50 may further include a sensory module 78. The processor 70 or other circuitry may be embodied as, include or otherwise control the sensory module 78. The sensory module 78 may be configured to record content and/or capture other sensory data. The sensory module 78 may thereby provide for storage of content and/or other sensory data in the memory device 76, for example. The sensory module 78 may record video and/or audio in some embodiments. Thus, in some embodiments the sensory module 78 may comprise a camera sensor. The sensory module 78 may also include other sensors in some embodiments. For example, the sensory module 78 may comprise a compass (e.g., an electronic compass), a GPS device (or other location determination device), an accelerometer, a timer, and/or a gyroscope.

Sensory data provided by the sensory module 78 may be processed to determine information relating to the recorded content. In this regard, in some embodiments the apparatus 50 may further include a contextual characteristic determiner 80. The processor 70 or other circuitry may be embodied as, include or otherwise control the contextual characteristic determiner 80. The contextual characteristic determiner 80 may be configured to determine one or more contextual characteristics. In some embodiments the contextual characteristic determiner 80 may be configured to determine contextual characteristics associated with content segments recorded by the sensory module 78. As noted above, content segments may comprise portions of content recorded by the sensory module 78. For example, content segments may comprise one or more frames of video (and related audio in some embodiments) recorded by the sensory module 78.

In one embodiment the contextual characteristic determiner 80 may be configured to determine an orientation of the apparatus 50 based on compass data provided by the sensory module 78 compass. Further, the contextual characteristic determiner 80 may determine the location of the apparatus 50 based on location data provided by the sensory module 78 GPS device. Additionally, the contextual characteristic determiner 80 may determine a tilt angle of the apparatus 50 based on acceleration data provided by the sensory module 78 accelerometer and/or gyroscopic data provided by the sensory module gyroscope. Also, the contextual characteristic determiner 80 may determine the present time, or a relative time at which each content segment of the content is recorded, for example by using the sensory module 78 timer.

In some embodiments the contextual characteristic determiner 80 may also be configured to determine contextual characteristics based on sensory data from the sensory module 78 camera sensor. For example, the contextual characteristic determiner 80 may determine the zoom of the camera sensor. This information, in conjunction with the various other contextual characteristics described above, may provide data indicative of the field of view of the camera sensor at the time of capturing each content segment.

Further, the contextual characteristic determiner 80 may be configured to determine other contextual characteristics based on data provided by the sensory module 78 camera sensor. For example, the contextual characteristic determiner 80 may be configured to determine a dominant color of the content segments. A dominant color, as used herein, may refer to a color which appears in greater quantity than any other color within a content segment. This may be determined, for example, based on the number of pixels in the content segment exhibiting each color. Further, in some embodiments the contextual characteristic determiner 80 may determine a range of colors which comprise the dominant color. For example, light green and dark green may individually be less prevalent than another color in some instances, but the generic color "green," which may encompass both light and dark shades thereof, may be more prevalent than all other colors and hence green may be the dominant color. In this regard, the contextual characteristic determiner 80 may determine the dominant color based on varying degrees of specificity, which may be automatically determined or user specified in some embodiments.

In some embodiments the apparatus 50 may further include a contextual characteristic comparer 82. The processor 70 or other circuitry may be embodied as, include or otherwise control the contextual characteristic comparer 82. The contextual characteristic comparer 82 may be configured to compare the contextual characteristics (which may, for example, be determined by the contextual characteristic determiner 80) to determine at least one contextual characteristic similarity level between the content segments.

Figure 4:
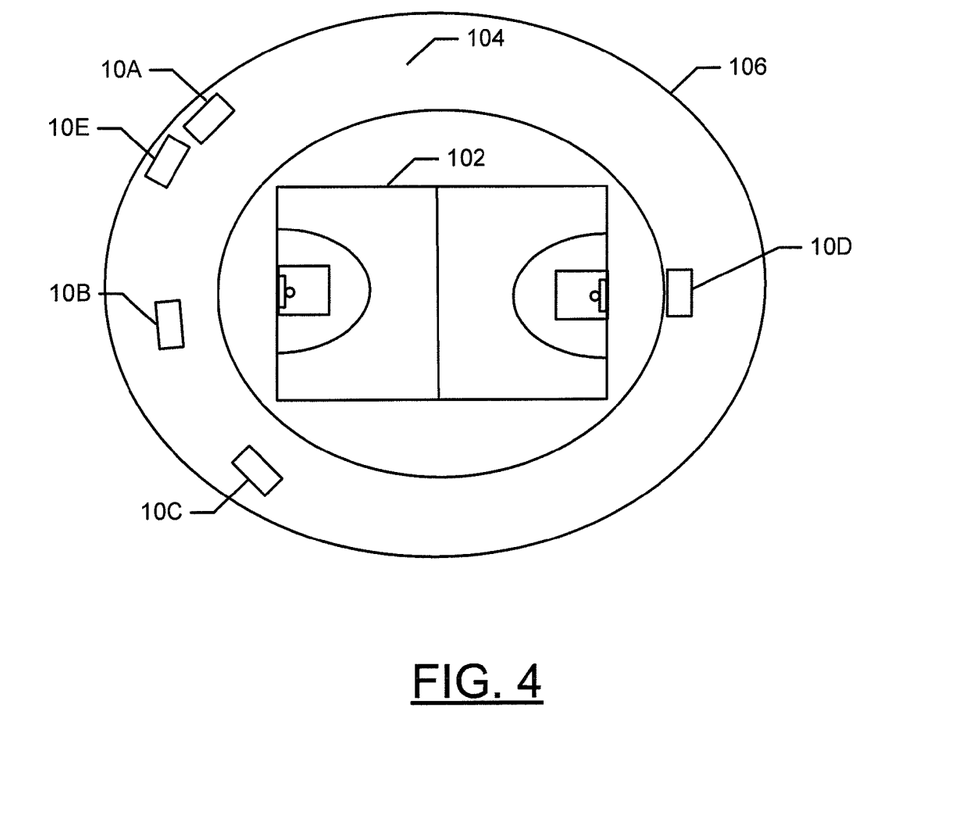
FIG. 4 illustrates use of a plurality of user terminals embodying the apparatus of FIG. 2 or 3 to record content segments at a basketball arena according to an example embodiment of the present invention.

For example, the apparatus 50 may compare contextual characteristics of content segments recorded by multiple user terminals. In this regard, FIG. 4 illustrates a schematic view of a plurality of user terminals 10A-E situated at a variety of positions around a basketball court 102 within a seating section 104 at a basketball arena 106. Each of the user terminals 10A-E may embody the apparatus 50, as discussed above. Therefore, each of the user terminals 10A-E may include a sensory module 78 configured to record content segments.

When two or more of the user terminals 10A-E record content segments, the contextual characteristics of the content segments may be compared by the contextual characteristic comparer 82. Thereby the contextual characteristic comparer 82 may determine a contextual similarity level indicating a degree of similarity between the contextual characteristics associated with the content segments. For example, the contextual characteristic comparer 82 may compare contextual characteristics relating to orientation, location, zoom, tilt angle, and dominant colors, as may be determined by the contextual characteristic determiner 80 in some embodiments. The contextual characteristics of one content segment may be compared relative to contextual characteristics of other content segments which are recorded at substantially the same time. In this regard, the contextual characteristic determiner 80 may tag the content segment with the contextual characteristics including time information relating to the time of recordation of the content segments (e.g., the time at which the content segments were recorded). Thereby, the contextual characteristic comparer 82 may compare contextual characteristics relating to content segments recorded at substantially the same time.

Thus, for example, the contextual characteristic comparer 82 may compare orientation data, location data, tilt angle data, and zoom data, as noted above. The contextual characteristic comparer 82 may compare orientation data to determine whether the user terminals 10A-E are pointed in the same direction (e.g., on a horizontal plane). The contextual characteristic comparer 82 may compare location data (e.g., coordinates) to determine whether the user terminals are at the same event. The contextual characteristic comparer 82 may compare tilt angles to determine whether the user terminals 10A-E are at approximately the same altitude or are pointed in the same direction (e.g., on a vertical plane). The contextual characteristic comparer 82 may compare zoom data to determine whether the user terminals 10A-E are recording the same breadth of view. Further, the contextual characteristic comparer 82 may compare dominant colors to determine whether the user terminals 10A-E are recording the same objects.

Accordingly, one or more contextual similarity levels may be calculated between each pair of the user terminals 10A-E, or between one initial user terminal and each of the other user terminals. For example, an initial user terminal may produce a desired view in the content segments, and thereby the other user terminals may be compared therewith. The contextual similarity level may be indicative of how similar the recorded content segments are to one another. For example, as illustrated in FIG. 4, user terminal 10A and user terminal 10E are positioned relatively close to one other in the seating section 104. Thus, the location data for the two user terminals 10A, 10E may be substantially similar. Since the two user terminals 10A, 10E are also positioned similarly relative to the basketball court 102, the orientation of the user terminals may be similar, assuming the user terminals are tracking the basketball game on the basketball court. Further, since the two user terminals 10A, 10E are positioned at substantially the same distance from the basketball court 102, they may be at substantially the same height in the seating section 104, and accordingly the tilt angle data provide by the gyroscope and/or accelerometer may be substantially similar. Additionally, zoom data from the camera sensor may be relatively similar since both the user terminals 10A, 10E are positioned at substantially the same distance from the basketball court 102. Also, dominant color data from the camera sensors may be relatively similar since both the user terminals 10A, 10E may be recording the basketball court 102.

Accordingly, the contextual characteristics associated with the content segments recorded by the two user terminals 10A, 10E may be substantially similar. Thus, the contextual similarity level(s) calculated by the contextual characteristic comparer 82 may be relatively high for the comparison of user terminal 10A and user terminal 10E. Note that in some embodiments the contextual characteristic comparer 82 may calculate contextual similarity levels for one or more of the contextual characteristics, whereas in other embodiments the contextual characteristic comparer may additionally or alternatively calculate a contextual similarity level relating to all of the contextual characteristics as a whole.

However, by way of further example, the contextual characteristics associated with user terminal 10A and user terminal 10D may be relatively less similar. In this regard, although the location data may be relatively similar since both user terminals 10A, 10D are located in the basketball arena 106, the orientation data may be relatively dissimilar since the user terminals are positioned on substantially opposite sides of the basketball court 102. Further, tilt angle data may also be relatively less similar because the user terminal 10D is positioned at a lower level closer to the basketball court 102 than the user terminal 10A (assuming tiered bleacher-style seating). Additionally, the zoom data may be relatively less similar because the user terminal 10D is relatively closer to the basketball court 102 than the user terminal 10A. Also, dominant color data from the camera sensors may be relatively less similar since the user terminals may be recording the basketball court 102 from different perspectives. Thus, the contextual similarity level(s) calculated by the contextual characteristic comparer 82 may be relatively lower for comparison of user terminal 10A and user terminal 10D than for comparison of user terminal 10A and user terminal 10E.

As illustrated in FIG. 3, in some embodiments the apparatus 50 may further include a brightness determiner 84. The processor 70 or other circuitry may be embodied as, include or otherwise control the brightness determiner 84. The brightness determiner 84 may be configured to determine the brightness level of content segments. Brightness level, as used herein, refers to the amount of light recorded in the content segments. Thus, the brightness level is inversely proportional to the darkness in the content segments. In some embodiments the sensory module 78 may directly provide a brightness level to the brightness determiner 84, whereas in other embodiments the sensory module may provide other data indicative of the brightness level, such as exposure (e.g., length of time the sensor records for each image), digital gain, and/or analog gain.

Note that in some embodiments the exposure may be set at a fixed time period so that the content defines a desired frame rate. Accordingly, exposure may not be a useful indicator of brightness level in some embodiments. In other embodiments brightness level may be determined by the brightness determiner as a post-processing step. For example, the brightness level may be determined by calculating the average of the red, green, and blue components of the content segments. However, calculating the brightness level as a post-processing step may require additional processing and processing time. Accordingly in some embodiments the other above-described methods for determining the brightness level may be employed when possible.

The brightness determiner 84 may function to standardize the determined brightness levels in some embodiments. For example, the brightness levels may be categorized into "dark" or "light" categories. However, the brightness determiner 84 may categorize the brightness level into more specific categories in other embodiments, such as "low," "medium," or "high," although various other degrees and types of categorization of the brightness levels may be employed. The brightness determiner 84 may then tag the content segment with the determined brightness level along with a time stamp indicating the time at which the content segment was recorded, or a single timestamp may be employed when the contextual characteristics were determined for the same content segment.

In some embodiments the apparatus 50 may further include a shake determiner 85. The processor 70 or other circuitry may be embodied as, include or otherwise control the shake determiner 85. The shake determiner 85 may be configured to determine the shake level of content segments. Shake level, as used herein, may refer to a measurement of the amount and/or rate of movement of the apparatus 50. In this regard, the shake determiner 85 may determine the shake level based on data provided by the accelerometer and/or gyroscope of the sensory device 78.

In some embodiments the shake determiner 85 may standardize the shake level information such that it may be compared with other shake levels, in a manner that may be similar to that discussed above for the brightness level. For example, content segments may be determined to be "shaky" or "stabile" in some embodiments, although various other levels of specificity may be employed in other embodiments. In some embodiments the categories for the shake levels may be determined empirically by determining what constitutes acceptable shake levels, although various other methods may be employed to categorize shake levels. Further, the shake determiner 85 may tag the content segments with 3-axis data received from the accelerometer (and/or gyroscopic data from the gyroscope) of the sensory device 78 and time information relating to the time at which content segments are recorded.

In some embodiments the apparatus 50 may further include a blur determiner 86. The processor 70 or other circuitry may be embodied as, include or otherwise control blur determiner 86. The blur determiner 86 may be configured to determine a plurality of blur levels for the captured content segments. Blur may be caused, for example, by a recorded object moving too fast. Blur levels may be calculated via one or more of a number of content analysis techniques in some embodiments. For example, the blur level may be calculated as the peak signal to noise ratio of a video segment, with relatively higher signal to noise ratios corresponding to lower blur levels. Thus, lower blur levels may correspond to higher quality content segments.

In some embodiments the blur determiner 86 may standardize the blur level information such that it may be compared with other blur levels, in a manner that may be similar to that discussed above for the brightness and shake levels. For example, content segments may be determined to be "blurry" or "clear" in some embodiments, although various other levels of specificity may be employed in other embodiments. In some embodiments the categories for the blur levels may be determined empirically by determining what constitutes acceptable blur levels, although various other methods may be employed to categorize blur levels. Further, the blur determiner 86 may tag the content segments with blur level data and time information relating to the time at which content segments are recorded.

In some embodiments the apparatus 50 may further include a content segment selector 88. The processor 70 or other circuitry may be embodied as, include or otherwise control the content segment selector 88. The content segment selector 88 may be configured to select one of the content segments based at least in part on the contextual similarity level and at least one of a brightness level, a blur level, and a shake level. In this regard, as noted above, low brightness levels may be an issue in the recordation of content, particularly in indoor environments. Additionally, by way of example, content segments that are recorded out of focus may be blurry. Further, by way of example, high shake levels may occur when an inexperienced person or a person with an unsteady hand is recording content. Accordingly, content may be combined from multiple content sources (e.g., multiple user terminals 10) so as to include content segments with relatively higher brightness levels, relatively lower blur levels, and/or relatively lower shake levels. The shake level, the blur level, and the brightness level may be considered sequentially (e.g., the brightness level may be considered before considering the blur level and then shake level, or in various other orders) when selecting content segments.

However, in order to create relatively seamless content from the content segments, the contextual characteristics may be considered. Therefore, as noted above, the content segment selector 88 may base the selection of content not only on brightness levels, blur levels, and/or shake levels, but also on contextual similarity levels. Accordingly, the content segment selector 88 may produce a resultant video from the content segments that are selected. The resultant video may comprise a combination of the selected content segments which create a video including content segments from each period of time over which content segments are recorded.

The contextual characteristics may be considered sequentially (e.g., the brightness level, blur level and/or shake level may be considered before considering the contextual characteristics, or vice versa) when selecting content segments. Or the shake level, blur level, brightness level, and contextual characteristics may be considered individually (e.g., consider the brightness level, blur level, and/or shake level, but don't consider the contextual characteristics, or vice versa) when selecting content segments. Thus, not all of the above discussed factors (e.g. brightness level, blur level, shake level, and contextual characteristics) may be considered in the selection of all content segments, and further the order in which the factors are considered may vary. For example, if maintaining a constant stream of sequential content segments of the same field of view is a top priority, the contextual characteristics may be considered first. However, by way of further example, if shake levels, blur levels, and/or brightness levels are a top priority, they may be considered before contextual characteristics when selecting content segments.

Figure 5:
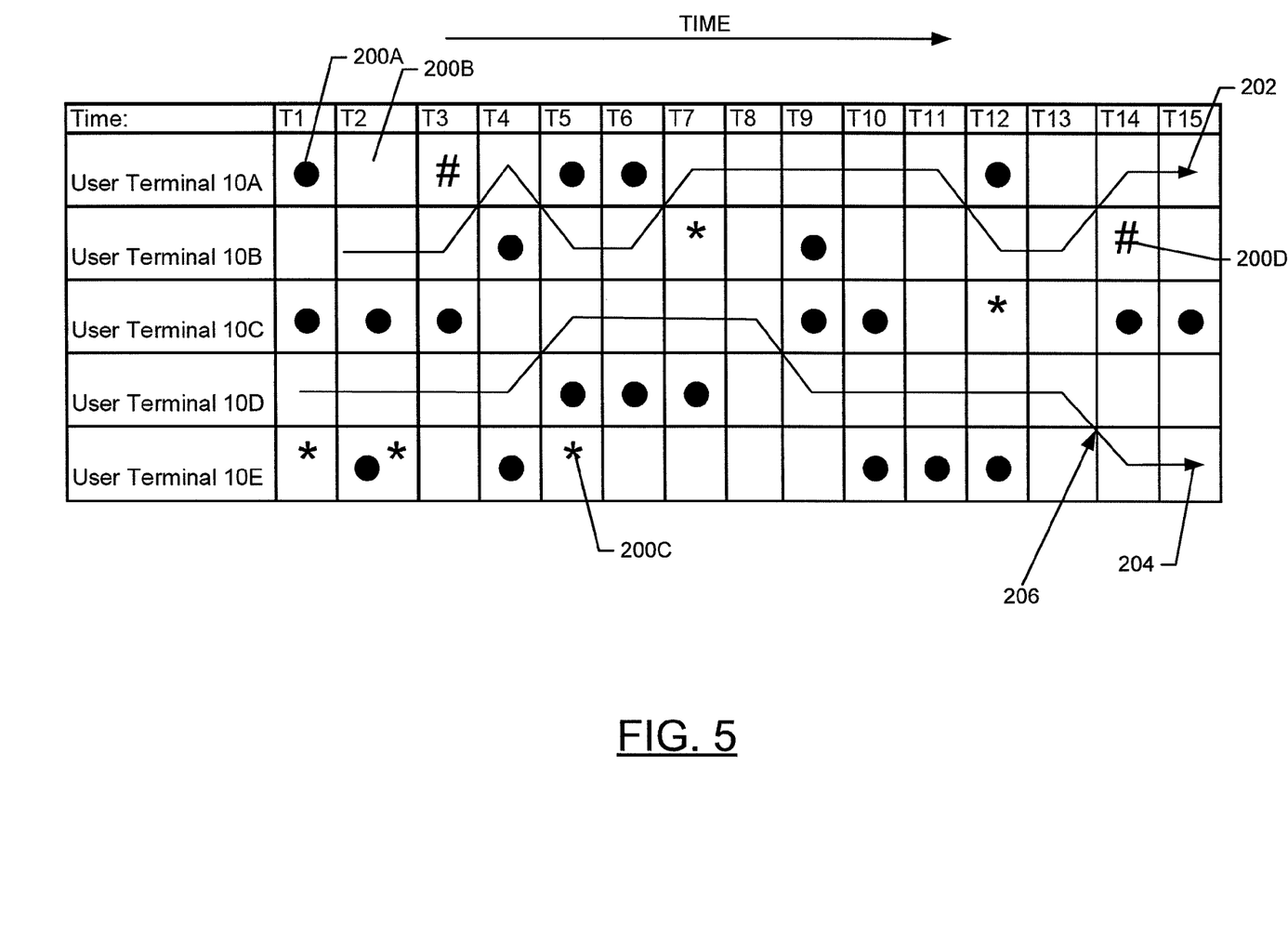
FIG. 5 illustrates selection of content segments according to an example embodiment of the present invention.

In some embodiments the content segment selector 88 may be configured to compare a calculated brightness level to a threshold brightness level. For example, depending on the categorization employed by the brightness determiner 84, the threshold brightness level may be that of "medium." Thereby, only content segments with brightness levels of "medium" or higher may be selected. In another example, embodiment, the brightness determiner 84 may categorize the content segments as "bright" or "dark." An example embodiment of selection of content segments employing these categories is illustrated in FIG. 5. As depicted, the content segment selector 88 may be configured to select content segments from the user terminals 10A-E. The boxes 200 correspond to individual brightness level determinations for the content segments associated with the user terminals 10A-E over the course of time. Boxes with a black circle (●) 200A correspond to brightness levels that are "dark." Boxes without a black circle (see, e.g., box 200B) correspond to brightness levels that are "bright."

Additionally or alternatively, in some embodiments the content segment selector 88 may be configured to compare a calculated shake level to a threshold shake level. For example, depending on the categorization employed by the shake determiner 85, the threshold shake level may be that of "medium." Thereby, only content segments with shake levels of "medium" or lower may be selected. In another example, embodiment, the shake determiner 85 may categorize the content segments as "shaky" or "stabile." FIG. 5 further illustrates an example embodiment of selection of content segments employing these categories. As depicted, the boxes 200 further correspond to individual shake level determinations for the content segments associated with the user terminals 10A-E over the course of time. Boxes with an asterisk (*) 200C correspond to shake levels that are "shaky." Boxes without an asterisk (see, e.g., box 200B) correspond to brightness levels that are "bright."

Also, in some embodiments the content segment selector 88 may be configured to compare a calculated blur level to a threshold blur level. For example, depending on the categorization employed by the blur determiner 86, the threshold blur level may be that of "medium." Thereby, only content segments with blur levels of "medium" or lower may be selected. In another example, embodiment, the blur determiner 86 may categorize the content segments as "blurry" or "clear." FIG. 5 further illustrates an example embodiment of selection of content segments employing these categories. As depicted, the boxes 200 further correspond to individual blur level determinations for the content segments associated with the user terminals 10A-E over the course of time. Boxes with a pound (#) symbol 200D correspond to blur levels that are "blurry." Boxes without a pound symbol (see, e.g., box 200B) correspond to blur levels that are "clear."

Further, lines 202 and 204 represent possible selections of content segments as indicated by the respective content sources which record the content segments (e.g., user terminal 10A-E). Thus, as illustrated, line 202 corresponds to selection of content segments from user terminal 10B at the beginning, moving to a content segment from user terminal 10A, then back to user terminal 10B, etcetera. The first switch from content segments from user terminal 10B to a content segment from user terminal 10A at time T4 may be as a result of the content segment from user terminal 10B at time T4 being "dark". Then the switch from the content segment from user terminal 10A to user terminal 10B at time T5 may be as a result of the content segment from user terminal 10A at time T5 being "dark". Further, the switch from user terminal 10B to user terminal 10A at time T7 may be as a result of user terminal 10B at time T7 being "shaky". Additionally, the switch from user terminal 10B to user terminal 10A at time T14 may be as a result of user terminal 10B at time T14 being "blurry". Accordingly, the content segment selector 88 may iteratively repeat the content segment selection process with the passage of time. Line 204 depicts alternative selections by the content segment selector 88 over the passage of time. In this regard, various other selections may occur as may be understood by one having skill in the art.

Note that some of the selections by the content segment selector 88 may be completely or partially based on factors other than the brightness level, blur level, and/or shake level of the content segments. For example, at the denoted point 206 the content segment is selected from a different user terminal despite the brightness level remaining "bright," the blur level remaining "clear," and the shake level remaining "stable". In this regard, in some embodiments the content segment selector 88 may be configured to select content segments from a new content source after the expiration of a predetermined period of time. However, the content segment selector 88 may also be configured to select content segments from other content sources for other reasons.

For example, in some embodiments the content segment selector 88 may be configured to only select content segments that have sufficiently similar contextual characteristics associated therewith. Thereby, for example, the content segment selector 88 may be configured to compare the calculated contextual similarity level to a threshold similarity level. For example, a threshold similarity may be selected to correspond to an overlapping field of view. In this regard, at least the location, tilt angle, and orientation data may be indicative of the field of view. Accordingly, a threshold similarity level may be set that is configured to correspond to an overlapping field of view.

Further, the threshold similarity level may in some embodiments relate to the dominant color. For example, the threshold similarity level may require the same dominant color. Identifying the dominant colors of content segments and selecting one of the content segments based at least in part on the dominant colors may be useful because the dominant color may be indicative of the object(s) being recorded. For example, in the basketball arena 106 illustrated in FIG. 4, the basketball court 102 may define a brown color, which a user may specify as a required dominant color in order to ensure that selected content segments record action on the basketball court. The dominant color data may also be used by the content segment selector 88 to make assumptions about the type of event that is being recorded. For example, a dominant color of green may be assumed to correspond to an outdoor event. Note that the threshold similarity level(s) may be user selectable in some embodiments, whereas in other embodiments the threshold similarity level(s) may be automatically selected by the content segment selector.

Thus, for example, the denoted point 206 at which the selected content segment source changes despite a continuing "bright" brightness level, a continuing "clear" blur level, and a continuing "stable" shake level for user terminal 10D may be the result of a change in contextual characteristics that decreases the contextual similarity level below the threshold similarity level. In this regard, the content segment selector 88 may in some embodiments only select content segments for which the associated contextual characteristics satisfy the threshold similarity level(s). Further, in some embodiments the content segment selector 88 may select the content segments that meet the contextual characteristic requirements (e.g. by exceeding one or more threshold similarity levels) and that have the greatest brightness levels, lowest blur levels, and/or lowest shake levels.

In one example embodiment the content segment selector 88 (and/or other components of the apparatus 50) may be embodied on the video producer 35, which may be a separate server, as described above. One or more user terminals 10, which may embody other components of the apparatus 50, may record content segments for selection by the video producer 35. However, various other embodiments may be possible as may be understood by one having skill in the art. For example, the content segment selector 88 may be embodied on a user terminal 10 in embodiments employing a P2P network. In this embodiment, the determined brightness levels, blur levels, and/or shake levels may be shared amongst the user terminals 10 which have contextual characteristics satisfying the threshold similarity level. In some embodiments sharing of contextual characteristic data, brightness level data, blur level data, shake level data, and/or content segment selection information may occur in real-time via extensible markup language (XML) or session description protocol (SDP), although any suitable communication protocol may be employed.

In some embodiments the content segment selector 88 may select the content segments in real-time. Therefore, recordation of the content segments may occur substantially simultaneously with selecting one of the content segments. Note that processing time, which may be required to compare the contextual characteristics and determine the brightness levels, blur levels, and/or shake levels, may delay the selection process slightly. However, in other embodiments the content segment selection may occur at a later time.

Further, in some embodiments the content segment selector 88 may be configured to stop recordation by a content source that captured one or more of the content segments that is not selected. For example, returning to FIG. 5, if at time T2 user terminal 10E is not selected (e.g., due to the brightness level being "dark", the shake level being "shaky", and/or the content segment failing to meet the threshold similarity level) the content segment selector 88 may be configured to direct user terminal 10E to stop recording one or more content segments. Thereby, battery life, memory space, and/or processing power may be saved at user terminal 10E and any other device to which the content segment may otherwise have been transmitted (e.g. the video producer 35). Accordingly, the content segment selector 88 may stop recordation of content segments on devices that fail to meet brightness level, blur level, shake level, and/or contextual characteristic requirements. In some embodiments the content segment selector 88 may only temporarily stop recordation, such that a new content segment may be recorded at a later time and determinations with respect to brightness level requirements, blur level requirements, shake level requirements, and/or contextual characteristic requirements may be made again at the later time.

As noted above, embodiments of the apparatus 50 may be embodied on the video producer 35 in some embodiments. In this regard, in one example embodiment all or a portion of the content segment selector 88 may be embodied on the video producer 35. Thereby, in one example embodiment, the video producer 35 (e.g., through use of the content segment selector 88), may signal a stop recordation indicator in the form of a threshold brightness level, a threshold blur level, and/or a threshold shake level to the content recording devices (e.g. user terminals 10A-E) which direct the content recording devices to stop recording one or more content segments when one or more of the threshold values are exceeded (e.g. through too low of a brightness level or too high of a blur or shake level). The content recording devices (e.g. the user terminals 10A-E) may then respectively determine whether or not to stop recording based on whether or not the threshold levels are exceeded. The term "stop recording," as used herein, may refer to ending ongoing recording and/or preemptive preventing recording when, for example, the brightness level, blur level, and/or shake level are determined to be unacceptable prior to any recording occurring.

In an alternate embodiment, the video producer 35 (e.g., through use of the content segment selector 88), may signal a stop recordation indicator to one or more of the content recording devices (e.g. user terminals 10A-E) that directs the one or more content recording devices to stop recording content segments when one or more of the brightness level, the blur level, and the shake level are unacceptable. In this embodiment the video producer 35 may use brightness level, blur level, and shake level information provided by each of the content recording devices (e.g. signaled therefrom) to make the decisions centrally, rather than by having the individual content recording devices determine whether to stop recording or not based on the threshold values. Thus, in some embodiments the video producer 35 may itself determine whether or not to stop recording of content segments by the one or more content recording devices, and in some embodiments the may occur in real-time. In an alternate embodiment one or more of the content recording devices (e.g., user terminals A-E) may perform the functions described above as being performed by the video producer 35.

Figure 6:
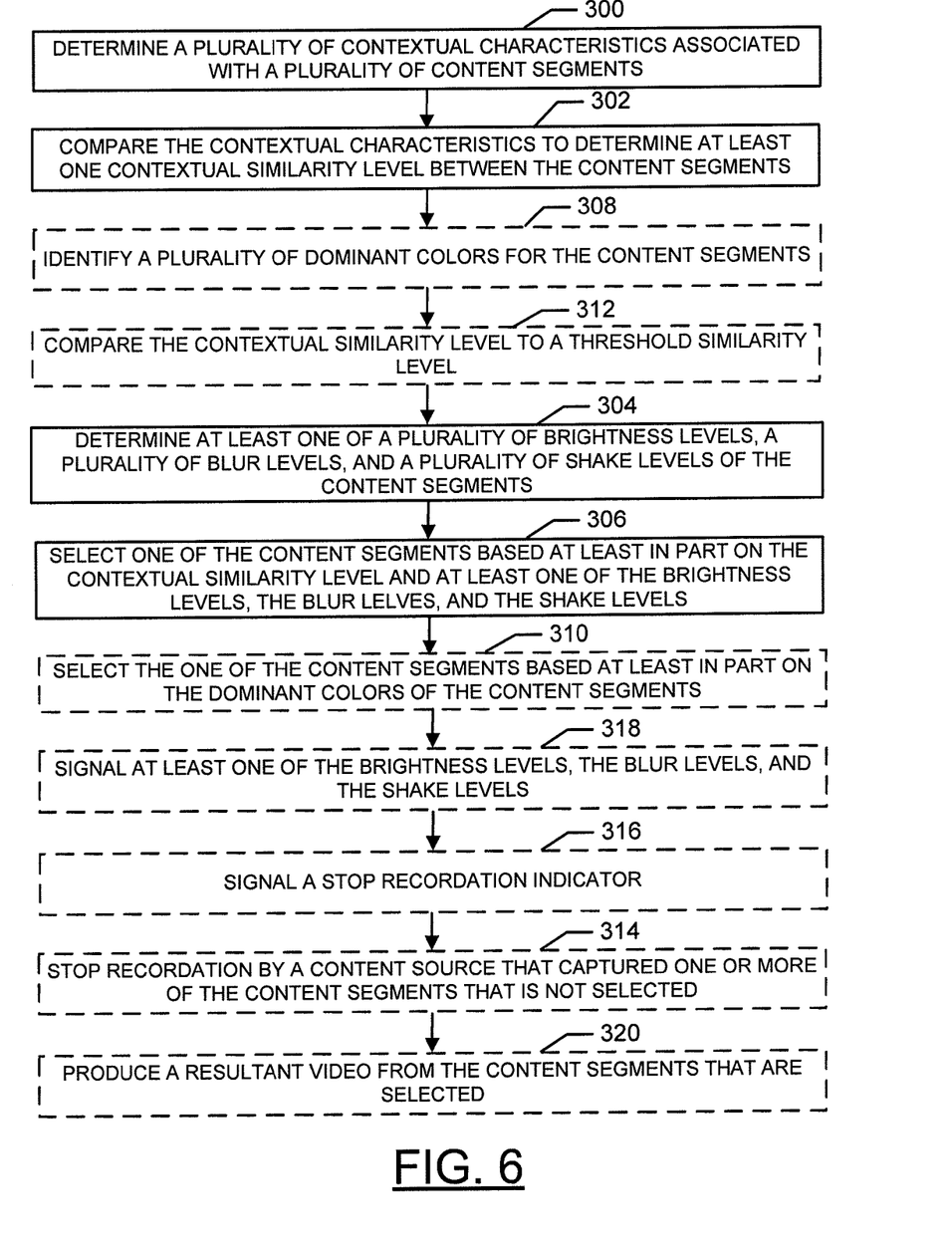
FIG. 6 illustrates a flowchart of the operations performed in selecting content segments according to an example embodiment of the present invention.

In terms of methods associated with embodiments of the present invention, the above-described apparatus 50 or other embodiments of apparatuses may be employed. In this regard, FIG. 6 is a flowchart of a system, method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by a computer program product including computer program instructions. In this regard, the computer program instructions which embody the procedures described above may be stored by a memory device and executed by a processor of an apparatus. As will be appreciated, any such computer program instructions may be loaded onto a computer or other programmable apparatus (for example, hardware) to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In this regard, one embodiment of a method may include determining a plurality of contextual characteristics associated with a plurality of content segments at operation 300. Further, the method may include comparing the contextual characteristics to determine at least one contextual similarity level between the content segments at operation 302. Additionally, the method may include determining at least one of a plurality of brightness levels, a plurality of blur levels, and a plurality of shake levels of the content segments at operation 304. Further, the method may include selecting one of the content segments based at least in part on the contextual similarity level and at least one of the brightness levels, the blur levels, and the shake levels at operation 306.

In some embodiments, certain ones of the above-described operations (as illustrated in solid lines in FIG. 6) may be modified or further amplified. In some embodiments additional operations may also be included (some examples of which are shown in dashed lines in FIG. 6). It should be appreciated that each of the modifications, optional additions or amplifications may be included with the above-described operations (300-306) either alone or in combination with any others among the features described herein. As such, each of the other operations as will be described herein may be combinable with the above-described operations (300-306) either alone or with one, more than one, or all of the additional operations in any combination.

For example, the method may also include identifying a plurality of dominant colors for the content segments at operation 308. Thus, selecting one of the content segments at operation 306 may comprise selecting the one of the content segments based at least in part on the dominant colors of the content segments at operation 310. Additionally, the method may include comparing the contextual similarity level to a threshold similarity level at operation 312. In some embodiments the threshold similarity level may correspond to an overlapping field of view. In some embodiments the method may further comprise stopping recordation by a content source that captured one or more of the content segments that is not selected at operation 314. In this regard, the method may also include signaling a stop recordation indicator at operation 316. For example, the stop recordation indicator may comprise one or more threshold levels. In some embodiments the method may also include signaling at least one of the brightness levels, the blur levels, and the shake levels at operation 318. Thereby, in some embodiments the stop recordation indicator may comprise a command or request for stopping of recordation. Further, as illustrated at operation 320, the method may include producing a resultant video from the content segments that are selected.

In an example embodiment, an apparatus for performing the method of FIG. 6 and other methods described above may comprise a processor (for example, the processor 70) configured to perform some or each of the operations (300-320) described above. The processor may, for example, be configured to perform the operations (300-320) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-320 may comprise, for example, the processor 70, the user interface 72, the communication interface 74, the sensory module 78, the contextual characteristic determiner 80, the contextual characteristic comparer 82, the brightness determiner 84, the shake determiner 85, the blur determiner 86, and the content segment selector 88, as described above. However, the above-described portions of the apparatus 50 as they relate to the operations of the method illustrated in FIG. 6 are merely examples, and it should be understood that various other embodiments may be possible.

In some embodiments the operation 300 of determining a plurality of contextual characteristics associated with a plurality of content segments may be conducted by means, such as the sensory module 78, the contextual characteristic determiner 80, and/or the processor 70. Further, the operation 302 of comparing the contextual characteristics to determine at least one contextual similarity level between the content segments may be conducted by means, such as the contextual characteristic determiner 80, the contextual characteristic comparer 82, and/or the processor 70. Additionally, the operation 304 of determining at least one of a plurality of brightness levels, a plurality of blur levels, and a plurality of shake levels of the content segments may be conducted by means, such as the sensory module 78, the contextual characteristic determiner 80, the brightness determiner 84, the shake determiner 85, the blur determiner 86, and/or the processor 70. Also, the operation 306 of selecting one of the content segments based at least in part on the contextual similarity level and at least one of the brightness levels, the blur levels, and the shake levels may be conducted by means, such as the contextual characteristic determiner 80, the contextual characteristic comparer 82, the brightness determiner 84, the shake determiner 85, the blur determiner 86, the content segment selector 88, and/or the processor 70.

Additionally, the operation 308 of identifying a plurality of dominant colors for the content segments may be conducted by means, such as the sensory module 78, the contextual characteristic determiner 80, and/or the processor 70. Further, the operation 310 of selecting the one of the content segments based at least in part on the dominant colors of the content segments may be conducted by means, such as the sensory module 78, the contextual characteristic determiner 80, the content segment selector 88, and/or the processor 70. Also, the operation 312 of comparing the contextual similarity level to a threshold similarity level may be conducted by means, such as the contextual characteristic comparer 82, the content segment selector 88, and/or the processor 70. Additionally, the operation 314 of stopping recordation by a content source that captured one or more of the content segments that is not selected, the operation 316 of signaling a stop recordation indicator, and the operation 318 of signaling at least one of the brightness levels, the blur levels, and the shake levels may be conducted by means, such as the content segment selector 88, the communication interface 74, and/or the processor 70. Further, the operation 320 of producing a resultant video from the content segments that are selected may be conducted by means, such as the content segment selector 88, and/or the processor 70.

Thus, in one embodiment an apparatus (e.g., apparatus 50) is provided comprising at least one processor and at least one memory including computer program code, the at least one memory and the computer program code configured to, with the processor, cause the apparatus to determine a plurality of contextual characteristics associated with a plurality of content segments. Further, the apparatus may compare the contextual characteristics to determine at least one contextual similarity level between the content segments. Also, the apparatus may determine at least one of a plurality of brightness levels, a plurality of blur levels, and a plurality of shake levels of the content segments. Thereby, the apparatus may select one of the content segments based at least in part on the contextual similarity level and at least one of the brightness levels, the blur levels, and the shake levels.

In some embodiments the apparatus may be further configured to stop recordation by a content source that captured one or more of the content segments that is not selected. The apparatus may be further configured to signal a stop recordation indicator. Also, the apparatus may be configured to signal at least one of the brightness levels, the blur levels, and the shake levels. The apparatus may also be configured to identify a plurality of dominant colors for the content segments, and select the one of the content segments based at least in part on the dominant colors of the content segments. In some embodiments recordation of the content segments may occur substantially simultaneously with selection of the one of the content segments.

The apparatus may be further configured to produce a resultant video from the content segments that are selected. Also, the apparatus may compare the contextual similarity level to a threshold similarity level. Additionally, the apparatus may include user interface circuitry configured to facilitate user control of at least some functions of the apparatus through use of a display. Also, the user interface circuitry may cause at least a portion of a user interface of the apparatus to be displayed on the display to facilitate user control of at least some functions of the apparatus.

As further noted above, embodiments of methods (see, e.g., FIG. 6) are provided. In one example embodiment a method may comprise determining a plurality of contextual characteristics associated with a plurality of content segments, comparing the contextual characteristics via a processor to determine at least one contextual similarity level between the content segments, and determining at least one of a plurality of brightness levels, a plurality of blur levels, and a plurality of shake levels of the content segments. Further, the method may include selecting one of the content segments based at least in part on the contextual similarity level and at least one of the brightness levels, the blur levels, and the shake levels.

In some embodiments the method may further comprise stopping recordation by a content source that captured one or more of the content segments that is not selected. The method may also include signaling a stop recordation indicator. Additionally, the method may include signaling at least one of the brightness levels, the blur levels, and the shake levels. Also, the method may include identifying a plurality of dominant colors for the content segments, wherein selecting the one of the content segments comprises selecting the one of the content segments based at least in part on the dominant colors of the content segments. Further, recordation of the content segments may occur substantially simultaneously with selecting the one of the content segments.

In some embodiments, the method may also comprise producing a resultant video from the content segments that are selected. The method may further comprise comparing the contextual similarity level to a threshold similarity level. The threshold similarity level may correspond to an overlapping field of view.

In a further embodiment a computer program product is provided. The computer program product may comprise at least one computer-readable storage medium having computer-executable program code portions stored therein. The computer-executable program code portions may comprise program code instructions for determining a plurality of contextual characteristics associated with a plurality of content segments and program code instructions for comparing the contextual characteristics to determine at least one contextual similarity level between the content segments. Further, the computer program produce may include program code instructions for determining at least one of a plurality of brightness levels, a plurality of blur levels, and a plurality of shake levels of the content segments. Thus, the computer program product may also include program code instructions for selecting one of the content segments based at least in part on the contextual similarity level and at least one of the brightness levels, the blur levels, and the shake levels.

In some embodiment the computer program produce may further comprise program code instructions for stopping recordation by a content source that captured one or more of the content segments that is not selected. Also, the computer program product may include program code instructions for signaling a stop recordation indicator and program code instructions for signaling at least one of the brightness levels, the blur levels, and the shake levels. Additionally, the computer program product may include program code instructions for identifying a plurality of dominant colors for the content segments. The program code instructions for selecting the one of the content segments may comprise program code instructions for selecting the one of the content segments based at least in part on the dominant colors of the content segments.

In a further embodiment the computer program product may comprise program code instructions configured to cause recordation of the content segments to occur substantially simultaneously with selecting the one of the content segments. The computer program product may additionally include program code instructions for producing a resultant video from the content segments that are selected. Also, the computer program product may comprise program code instructions for comparing the contextual similarity level to a threshold similarity level.

Further, embodiments provide means for performing the methods and functions described above. In this regard, one embodiment of an apparatus comprises means for determining a plurality of contextual characteristics associated with a plurality of content segments. The apparatus may additionally comprise means for comparing the contextual characteristics to determine at least one contextual similarity level between the content segments. Further, the apparatus may comprise means for determining at least one of a plurality of brightness levels, a plurality of blur levels, and a plurality of shake levels of the content segments. Also, the apparatus may comprise means for selecting one of the content segments based at least in part on the contextual similarity level and at least one of the brightness levels, the blur levels, and the shake levels.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and the computer program code configured to, with the processor, cause the apparatus to:
   determine a plurality of contextual characteristics associated with a plurality of content segments;
   compare the contextual characteristics to determine at least one contextual similarity level between the content segments;
   determine at least one of a plurality of brightness levels, a plurality of blur levels, and a plurality of shake levels of the content segments; and
   select one of the content segments based at least in part on the contextual similarity level and at least one of the brightness levels, the blur levels, and the shake levels.

2. The apparatus of claim 1, further configured to stop recordation by a content source that captured one or more of the content segments that is not selected.

3. The apparatus of claim 2, further configured to cause a stop recordation indicator to be signaled.

4. The apparatus of claim 3, further configured to cause at least one of the brightness levels, the blur levels, and the shake levels to be signaled.

5. The apparatus of claim 1, further configured to:
   identify a plurality of dominant colors for the content segments, and
   select the one of the content segments based at least in part on the dominant colors of the content segments.

6. The apparatus of claim 1, wherein recordation of the content segments occurs substantially simultaneously with selection of the one of the content segments.

7. The apparatus of claim 1, further configured to produce a resultant video from the content segments that are selected.

8. The apparatus of claim 1, further configured to compare the contextual similarity level to a threshold similarity level.

9. The apparatus of claim 8, wherein the threshold similarity level corresponds to an overlapping field of view.

10. The apparatus of claim 1, further comprising user interface circuitry configured to:
    facilitate user control of at least some functions of the apparatus through use of a display; and
    cause at least a portion of a user interface of the apparatus to be displayed on the display to facilitate user control of at least some functions of the apparatus.

11. A method, comprising:
    determining a plurality of contextual characteristics associated with a plurality of content segments;
    comparing the contextual characteristics with a processor to determine at least one contextual similarity level between the content segments;
    determining at least one of a plurality of brightness levels, a plurality of blur levels, and a plurality of shake levels of the content segments; and
    selecting one of the content segments based at least in part on the contextual similarity level and at least one of the brightness levels, the blur levels, and the shake levels.

12. The method of claim 11, further comprising stopping recordation by a content source that captured one or more of the content segments that is not selected.

13. The method of claim 12, further comprising causing a stop recordation indicator to be signaled.

14. The method of claim 13, further comprising causing at least one of the brightness levels, the blur levels, and the shake levels to be signaled.

15. The method of claim 11, further comprising:
    identifying a plurality of dominant colors for the content segments,
    wherein selecting the one of the content segments comprises selecting the one of the content segments based at least in part on the dominant colors of the content segments.

16. The method of claim 11, wherein recordation of the content segments occurs substantially simultaneously with selecting the one of the content segments.

17. The method of claim 11, further comprising producing a resultant video from the content segments that are selected.

18. The method of claim 11, further comprising comparing the contextual similarity level to a threshold similarity level.

19. The method of claim 18, wherein the threshold similarity level corresponds to an overlapping field of view.

20. A computer program product comprising at least one computer-readable storage medium having computer-executable program code portions stored therein, the computer-executable program code portions comprising:
    program code instructions for determining a plurality of contextual characteristics associated with a plurality of content segments;
    program code instructions for comparing the contextual characteristics to determine at least one contextual similarity level between the content segments;
    program code instructions for determining at least one of a plurality of brightness levels, a plurality of blur levels, and a plurality of shake levels of the content segments; and program code instructions for selecting one of the content segments based at least in part on the contextual similarity level and at least one of the brightness levels, the blur levels, and the shake levels.

\* \* \* \* \*